United States Patent
Wormser (10) Patent No.: US 9,873,840 B2
(45) Date of Patent: Jan. 23, 2018

(54) INTEGRATED GASIFICATION COMBINED CYCLE PLANT WITH CHAR PREPARATION SYSTEM

(75) Inventor: Alex Wormser, Marblehead, MA (US)

(73) Assignee: Wormser Energy Solutions, Inc., Marblehead, MA (US)

( * ) Notice: Subject to any disclaimer, the term of this patent is extended or adjusted under 35 U.S.C. 154(b) by 1033 days.

(21) Appl. No.: 13/394,823

(22) PCT Filed: Sep. 20, 2010

(86) PCT No.: PCT/US2010/049490
§ 371 (c)(1),
(2), (4) Date: Mar. 8, 2012

(87) PCT Pub. No.: WO2011/035241
PCT Pub. Date: Mar. 24, 2011

(65) Prior Publication Data
US 2012/0167585 A1    Jul. 5, 2012

Related U.S. Application Data

(63) Continuation of application No. PCT/US2009/069455, filed on Dec. 23, 2009.
(Continued)

(51) Int. Cl.
*C10J 3/48* (2006.01)
*C10J 3/84* (2006.01)
(Continued)

(52) U.S. Cl.
CPC ............. *C10J 3/482* (2013.01); *C10J 3/84* (2013.01); *C10K 1/004* (2013.01); *C10K 1/005* (2013.01);
(Continued)

(58) Field of Classification Search
CPC ... F02C 3/28; F02C 3/26; Y02E 20/18; Y02E 20/185; C10J 3/482; C10J 3/84
See application file for complete search history.

(56) References Cited

U.S. PATENT DOCUMENTS

| | | | |
|---|---|---|---|
| 2,582,711 A | 1/1952 | Nelson | |
| 2,689,787 A | 9/1954 | Ogorzaly et al. | |

(Continued)

FOREIGN PATENT DOCUMENTS

| | | |
|---|---|---|
| CN | 1272870 | 11/2000 |
| CN | 1676210 | 10/2005 |

(Continued)

OTHER PUBLICATIONS

"2nd Office Action" for Chinese Patent Application No. 200880024923.3, dated Jul. 5, 2013, 3 pages, State Intellectual Property Office of the People's Republic of China, People's Republic of China.

(Continued)

*Primary Examiner* — Craig Kim
(74) *Attorney, Agent, or Firm* — Kurt Rauschenbach; Rauschenbach Patent Law Group, LLC (57) ABSTRACT

Provided herein are systems, methods and equipment that include Integrated Gasification Combined-Cycle technology to retrofit existing plants, that include, e.g., subsystems for separating char fines from syngas after it emerges from an internally-circulating fluidized bed carbonizer and injecting the char into the carbonizer draft tube as a fuel source. Efficiency and power generation are thus increased to the extent that inclusion of carbon capture systems are now possible for existing coal plants in order to significantly reduce carbon dioxide emissions.

12 Claims, 6 Drawing Sheets

Related U.S. Application Data (60) Provisional application No. 61/243,687, filed on Sep. 18, 2009, provisional application No. 61/243,906, filed on Sep. 18, 2009, provisional application No. 61/365,187, filed on Jul. 16, 2010, provisional application No. 61/244,035, filed on Sep. 19, 2009.

(51) Int. Cl.
*C10K 1/00* (2006.01)
*C10K 1/02* (2006.01)
*C10J 3/72* (2006.01)

(52) U.S. Cl.
CPC ............... *C10K 1/024* (2013.01); *C10J 3/725* (2013.01); *C10J 2200/156* (2013.01); *C10J 2300/093* (2013.01); *C10J 2300/0956* (2013.01); *C10J 2300/0976* (2013.01); *C10J 2300/1606* (2013.01); *C10J 2300/1675* (2013.01); *Y02E 20/18* (2013.01)

(56) References Cited

U.S. PATENT DOCUMENTS

| | | | |
|---|---|---|---|
| 4,400,181 A | | 8/1983 | Snell et al. |
| 4,738,207 A | * | 4/1988 | Moss ..................... 110/347 |
| 5,236,354 A | | 8/1993 | Goldbach et al. |
| 5,296,005 A | * | 3/1994 | Wolfe ................... C10L 37/10 44/281 |
| 5,469,698 A | * | 11/1995 | Garcia-Mallol ...... F01K 23/067 60/39.12 |
| 5,536,488 A | | 7/1996 | Mansour et al. |
| 5,553,557 A | * | 9/1996 | Abdulally .................. 110/345 |
| 5,688,296 A | | 11/1997 | Andrus et al. |
| 5,728,361 A | * | 3/1998 | Holley ..................... C09C 1/48 423/449.6 |
| 5,782,032 A | * | 7/1998 | Tanaka ................... C10J 3/487 110/229 |
| 5,917,136 A | | 6/1999 | Gaffney et al. |
| 7,314,847 B1 | | 1/2008 | Siriwardane |
| 2004/0123601 A1 | * | 7/2004 | Fan ................................ 60/781 |
| 2004/0237404 A1 | * | 12/2004 | Andrus et al. .................. 48/101 |
| 2006/0000143 A1 | * | 1/2006 | Nagato ................... C10J 3/463 48/198.2 |
| 2009/0199474 A1 | * | 8/2009 | Leininger ................. C10J 3/52 48/69 |
| 2010/0281878 A1 | * | 11/2010 | Wormser ................. C10J 3/482 60/781 |
| 2011/0116979 A1 | * | 5/2011 | Yamamoto ............... C10J 3/485 422/162 |
| 2012/0000175 A1 | * | 1/2012 | Wormser ................. C10J 3/463 60/39.12 |
| 2012/0037732 A1 | * | 2/2012 | Stevenson ................ F02C 3/20 239/600 |

FOREIGN PATENT DOCUMENTS

| | | |
|---|---|---|
| EP | 0 227 550 A2 | 7/1987 |
| EP | 0274637 A1 | 7/1988 |
| EP | 0619455 A2 | 10/1994 |
| TW | 245651 | 4/1995 |
| TW | 280849 | 7/1996 |
| TW | 442572 | 6/2001 |
| TW | I237103 B | 8/2005 |
| WO | 2008/157433 A2 | 12/2008 |
| WO | 2009/039393 A2 | 3/2009 |

OTHER PUBLICATIONS

"Response to 2nd Office Action" for Chinese Patent Application No. 200880024923.3, dated Sep. 22, 2013.
"Office Action" for Chinese Patent Application No. 201080041733.X, dated Nov. 15, 2013, 4 pages, State Intellectual Property Office of the People's Republic of China, People's Republic of China.
"Office Action" for Chinese Patent Application No. 201080041732.5, dated Jul. 24, 2013, 10 pages, State Intellectual Property Office of the People's Republic of China, People's Republic of China.
"Response to Office Action" for Taiwanese Patent Application No. 097122308, dated Jul. 23, 2013.
"Office Action" for Chinese Patent Application No. 200880024923.3, dated Jan. 22, 2014, 5 pages, The State of Intellectual Property Office of the People's Republic of China, Beijing, China.
"Second Office Action" for Chinese Patent Application No. 201080041732.5, dated May 30, 2014, 3 pages, The State of Intellectual Property Office of the People's Republic of China, Beijing, China.
"Notification Concerning Transmittal of International Preliminary Report on Patentability (Chapter I of the Patent Cooperation Treaty)" for PCT/US2010/049490, dated Mar. 29, 2012, 8 pages, The International Bureau of WIPO, Geneva, Switzerland.
"Office Action" for Taiwanese Patent Application No. 097122308, dated May 15, 2013, 6 pages, Taiwanese Patent Office, Taiwan.
"Office Action" for Chinese Patent Application No. 200880024923.3, dated Jan. 28, 2013, 4 pages, State Intellectual Property Office of the People's Republic of China, People's Republic of China.
"Response to Office Action" for Chinese Patent Application No. 200880024923.3, dated Jun. 2013, 6 pages.
"Office Action" for U.S. Appl. No. 12/664,639, dated Dec. 6, 2013, 22 pages, USPTO, US.
"European Search Report" for EP 10817982.1-1361/2478074, dated Oct. 17, 2013, 7 pages, European Patent Office, Rijswijk, Netherlands.
"European Search Report" for EP 10817971.4-1361/2478073, dated Dec. 3, 2013, 12 pages, European Patent Office, Rijswijk, Netherlands.
Fouhi, K., "Coal Comes Back", Chemical Engineering, Aug. 1, 1991, pp. 47-48ccc, vol. 98, No. 8, Access Intelligence Association, Rockville, MA, US.

* cited by examiner

INTEGRATED GASIFICATION COMBINED CYCLE PLANT WITH CHAR PREPARATION SYSTEM

CROSS REFERENCE TO RELATED APPLICATIONS

This application claims the benefit of, and priority to, U.S. Patent Application Ser. No. 61/243,687, filed Sep. 18, 2009, entitled "Coal Gasification," U.S. Patent Application Ser. No. 61/243,906, filed Sep. 18, 2009, entitled "Pressure-Swing Calcium Looping (PSCL)," U.S. Patent Application Ser. No. 61/244,035, filed Sep. 19, 2009, entitled "Calcium Looping," U.S. Patent Application Ser. No. 61/365,187, filed Jul. 16, 2010 and entitled "Carbon Capture Systems for Airblown Integrated Gasification Combined Cycles," and International (PCT) Patent Application Serial Number PCT/US2009/069455, filed Dec. 23, 2009, entitled "Mild Gasification Combined-Cycle Powerplant." This application is also related to International (PCT) Patent Application Serial Number PCT/US2008/067022, filed Jun. 13, 2008, entitled "Mild Gasification Combined-Cycle Powerplant," and International (PCT) Patent Application Serial Number PCT/US2010/049522, entitled "Systems, Devices And Methods For Calcium Looping," by Alex Wormser, filed on Sep. 20, 2010. The entire contents of these applications are incorporated herein in their entirety by this reference.

SUMMARY

The systems, methods and equipment described herein relate generally to clean-coal technology, and more specifically to IGCC technology that can be used to retrofit or upgrade existing pulverized coal (PC) plants or in the building of new power plants. Provided are systems that employ pulverized char, removed from carbonizer volatiles, to provide a source of heat to a carbonizer. Not only are the systems more efficient and generate more power, it is now possible to use high ash coal in pulverized coal plants. Also provided is an internally circulating fluidized bed gasifier that can include a second fluidized bed that can be employed as a syngas cooler, a desulfurizing bed and/or a thermal cracking bed in the same pressure vessel.

In one aspect, provided herein is an Integrated Gasification Combined-Cycle (IGCC) system for retrofitting existing plants. The system generally includes: an internally-circulating fluidized bed carbonizer that forms a syngas and a char from a solid fuel; a syngas cooler in communication with the carbonizer; a separator in communication with the syngas cooler that separates the char from the syngas; a char preparation system in communication with the separator that prepares the char to be injected into the carbonizer; and an injector that receives the pulverized char from the char preparation system and introduces the pulverized char into the carbonizer, whereby the pulverized char provides a source of heat to the carbonizer. The char preparation system can include a cooler that removes heat from the char, a pulverizer in communication with the cooler that pulverizes the char, and an airlock in communication with the pulverizer. In some embodiments, the system includes a warm gas cleanup system and a carbon capture system in communication with the separator that cleans the syngas. In some embodiments, the system includes an ash separator in communication with the pulverizer. In some embodiments, the carbonizer includes a distributor plate disposed within the carbonizer under an annular bubbling bed of char, and a dipleg disposed beneath the carbonizer. Additionally or alternatively, a stream of high-density particles can be added to the annular bubbling bed of char. This increases the flow rate of the char in the bed.

In some embodiments, a carbonizer is provided that includes a draft tube with an outlet, and a draft tube extension mounted on the outlet of the draft tube. The extension includes an upper section and a lower section connected by a conical section such that the upper section has a larger diameter than the lower section. The system also includes a deflector disposed above the outlet of the draft tube that deflects the char emerging from the draft tube downwards, and a dipleg that provides for the downward flow of the char to the internally-circulating fluidized bed. In some embodiments, the carbonizer further includes a thermal cracking fluidized bed disposed on a distributor plate in the upper section of the draft tube extension.

In some embodiments, the carbonizer can include a fluidized bed with an upper bed and a lower bed, wherein the upper bed is a thermal cracking fluidized bed and the lower bed is a carbonizing bed. The bed can be continuous and have two zones that define the upper bed and the lower bed, or the beds can be physically separated, e.g., the upper bed disposed on, e.g., a distributor plate. In some embodiments, an agglomerator is mounted beneath the carbonizer.

In some embodiments, the pulverized char is injected, along with a stream of air for combustion of the char, into an inlet of a draft tube disposed in the carbonizer, and a coal stream is injected into the draft tube at a level above a char combustion zone in the draft tube.

In other embodiments, the pulverized char is injected, along with a stream of air for combustion of the char, into a plenum beneath a distributor plate located beneath an annular fluidized bed of char external to a draft tube disposed in the carbonizer, and coal is injected into an inlet of the draft tube. In some embodiments, an oxidant and a steam for gasifying the annular bed, are also injected into the plenum beneath the distributor plate. Additionally, in some embodiments, some or all of the oxidant for gasifying the annular bed is fed into the annular bed through sparge pipes located above the distributor plates to provide efficient combustion of the char. In some embodiments, a separator sleeve is mounted on an inner radius of the distributor plate such that the flow of the char into the inlet of the draft tube is limited. In any of the embodiments described herein, the solid fuel can be coal, including e.g., high ash coal.

In another aspect, a method of realizing a reduction in carbon dioxide emissions from an existing fossil-fueled power plant is provided. The method includes retrofitting an existing power plant to include any of the systems and equipment described herein. In some embodiments, the system includes a carbon capture system and a savings realized by retrofitting the system substantially equals or is less than an expenditure required to build a new coal fired power plant without a carbon capture system.

In some embodiments at least a 20%, 30%, 40% or 50% reduction in carbon dioxide emissions is realized by the retrofitted power plant. In some embodiments, an increased power generating capacity is realized in the retrofitted power plant.

In another aspect, a method for increasing the efficiency of an IGCC subsystem of a power plant is provided. The method includes carbonizing a solid fuel to produce a syngas stream and a char fines content, separating the char fines content from the syngas stream, cooling the char fines content, pulverizing the char fines content, reducing the ash fines concentration in the char fines content, and injecting the char fines into the carbonizer as a fuel. The efficiency of the IGCC subsystem is increased by the return of the char fines to the carbonator.

In some embodiments, the method further includes removing contaminants from the syngas. The method includes filtering the syngas to provide a filtered syngas, adsorbing a halide component from the filtered syngas in a fixed bed reactor, and removing a sulfur component from the syngas with a regenerable desulfurizer that includes two circulating fluidized bed reactors that can be alternately employed to absorb the sulfur and regenerate the sorbent for continuous desulfurization.

Additionally or alternatively, the method can further include reducing the carbon dioxide content in the syngas, by removing a carbon dioxide component from the syngas with a regenerable decarbonizer comprising two circulating fluidized bed reactors that can be alternately employed to absorb the carbon dioxide component and regenerate a calcium oxide sorbent that adsorbs the carbon dioxide component thereby reducing the concentration of carbon dioxide in the syngas, and, optionally, compressing and storing the carbon dioxide component. In some embodiments, the carbonizing step also produces carbon monoxide, and the method further includes removing the carbon monoxide by a sorbent-enhanced reaction.

Additionally or alternatively, the systems or the methods described herein can further include, or include the use of an adiabatic calcium looping system for reducing carbon content in a syngas. The system can include at least one fixed-bed reactor having a fixed sorbent bed, the at least one fixed-bed reactor alternately configured in a pressurized carbonator configuration and a sub-atmospheric pressure calciner configuration, a calcium-based sorbent residing in the fixed sorbent bed for adsorbing the carbon in a syngas when the at least one fixed-bed reactor is configured in the carbonator configuration, and for desorbing the carbon when the at least one fixed-bed reactor is configured in the calciner configuration, and one or more valve mechanisms for alternately configuring the at least one fixed-bed reactor in the carbonator configuration and the calciner configuration.

BRIEF DESCRIPTION OF THE DRAWINGS

Reference is made to the accompanying figures and flow diagrams illustrating exemplary embodiments of the present invention, in which.

DETAILED DESCRIPTION

The systems, method and equipment described herein relate to Integrated Gasification Combined-Cycle (IGCC) technology that can be used to retrofit existing pulverized coal (PC) plants or in building new plants. The various embodiments and subsystems can be employed alone or in combination. Provided herein, e.g., are systems, methods and equipment for separating char from syngas after it emerges from an IGCC carbonizer and, after processing, injecting the char into the carbonizer draft tube as a fuel source. In these plants, char fines are allowed to escape in the volatiles from the carbonator, and are collected from the syngas, cooled, crushed and returned to the gasifier, where they are burned as fuel. This greatly reduces the size of the gasifier system, and enables the system to employ a wide variety of coals, including coals of varying rank, ash content, and moisture content. Smaller reactors are also made possible by the internally-circulating reactors for both the carbonators and desulfurizer, and the fluidized bed syngas cooler.

In some embodiments, the IGCC is a Mild Airblown Integrated Gasification Combined-Cycle (MaGIC) plant. Several suitable embodiments of MaGIC plants are described in International (PCT) Patent Application PCT/US2008/069455, published as WO 2010/075536 on Jul. 1, 2010, which is incorporated herein in its entirety by this reference. Two of the advantages of MaGIC are related to the use of air instead of oxygen, which increases its efficiency and has a 30% lower capital cost due in large part to the elimination of the oxygen plan in traditional IGCCs.

These plants are for use, e.g., in repowering existing coalplants, and due to the small equipment size can be fit into the site of, e.g., a decommissioned boiler. Decommissioning a boiler can also extend the economic life of an existing power plant, which is necessary for the economic repowering of existing plants. The plants described herein also reduce the amount of air needed for gasification, and with it, the size and cost of the gasifier system, by avoiding the combustion of the volatiles released in the gasifier.

Another advantage of the systems, equipment and methods described herein is that the technology is inexpensive enough to provide a new source of electricity, even with carbon capture, that is competitive with electricity provided by the lowest cost alternatives, including pulverized coal plants. Thus, a real cost benefit is realized as opposed to conventional "add-on" technologies that can reduce emissions, but are not economically feasible in the absence of carbon taxes or other legislated sources of funding.

As used herein, the articles "a" and "an" mean "one or more" or "at least one," unless otherwise indicated. That is, the use of the indefinite article "a" or "an" does not exclude the possibility that more than one of the element is present.

As used herein, the term "plant" and the term "system" are used interchangeably.

As used herein, the terms "retrofit" and "repowering" and "upgrade" are used interchangeably.

As used herein, the terms "volatiles" and "volatile matter" are used interchangeably to refer to mixtures of hydrocarbon gases and vapors, as well as other (non-fuel) gases (e.g., gases that are emitted from coal when it is heated to a sufficiently high temperature. Some of the hydrocarbon vapors are called tars, in reference to their appearance when they condense.

Figure 1:
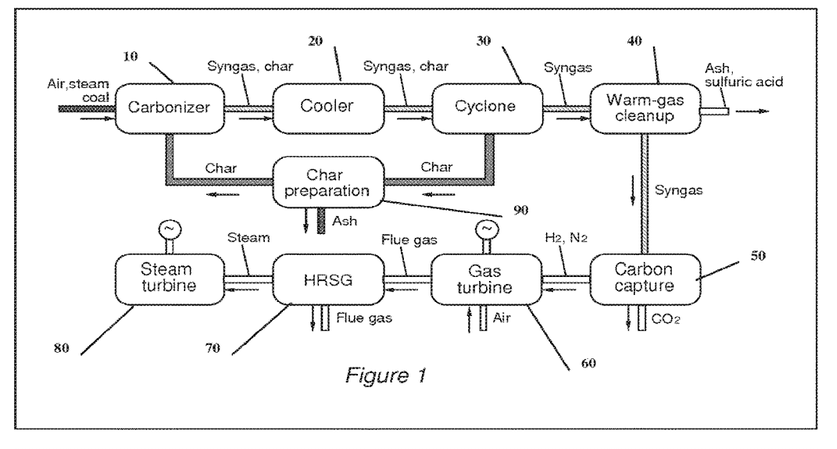
FIG. 1 is a flow diagram depicting an exemplary configuration of an IGCC employed to generate electricity.
Figure 6:
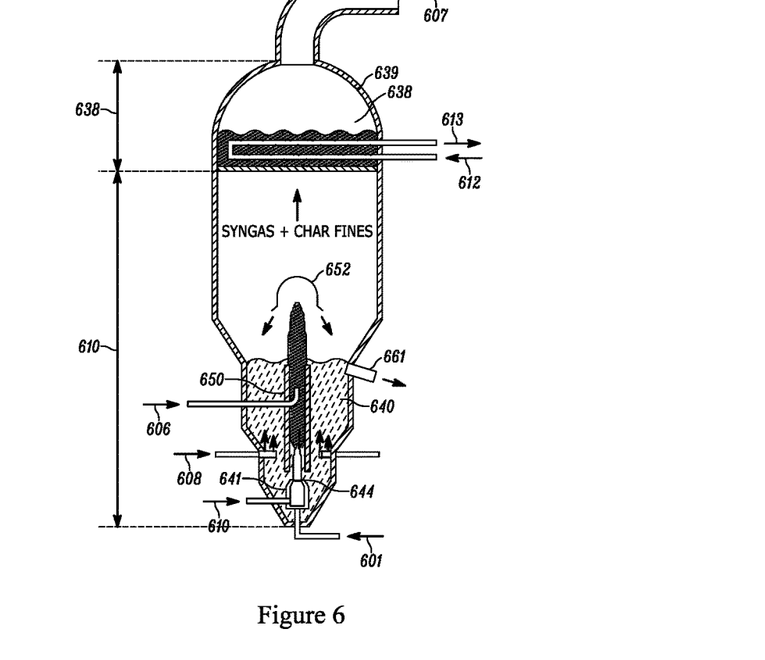
FIG. 6 is a diagram depicting an exemplary carbonizer.

An exemplary process flow diagram is depicted in FIG. 1. The carbonizer 10 is fed coal, steam, and air to produce syngas and char. The syngas and char flow through a cooler 20 and then a cyclone 30, which removes the char fines from the syngas. The syngas flows through the warm-gas cleanup system 40, which can include e.g., a halide scrubber, desulfurizer, and high-temperature filter (see FIG. 4) to remove, e.g., ash and sulfuric acid. The syngas flows to carbon capture 50, e.g., a calciner, where carbon dioxide is removed. The hydrogen and nitrogen produced in the carbon capture flow to a gas turbine 60 and the flue gas sent on to a heat recovery steam generator (HRSG) 70. The HRSG may be an existing PC plant, a newly built HRSG, or in some cases, the combination of an existing steam plant and a new HRSG. Steam from the HRSG can then be sent to power a steam turbine 80. The char separated in the cyclone 30 flows to a char preparation system 90, depicted in greater detail in FIG. 2, where ash is removed and the char is sent back to the carbonizer 10 to be injected as fuel. In some embodiments, the carbonizer 10 and the syngas cooler 20 are disposed within the same pressure vessel (FIG. 6).

One of the benefits of burning the char fines in the carbonizer is that it eliminates the problems associated with the partial gasification alternatives. In retrofitting existing plants, the existing boiler can be decommissioned to make room for the new equipment described herein, and to life-extend the power plant thereby rendering the upgrade affordable. It also eliminates the inefficiency of burning significant amounts of char in the decommissioned boiler.

The current systems and methods are also advantageous with respect to external fluidized bed designs where the char fines are burned in the external fluidized bed, and costly coolers and filters are necessary. In addition, in the external fluidized bed, the need for the combustion air to burn the char fines greatly expands the volumetric flowrate that then must be cooled and cleaned.

Figure 2:
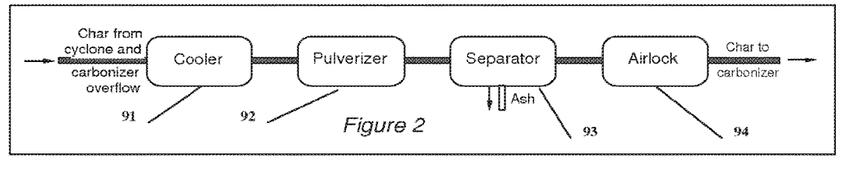
FIG. 2 is a flow diagram depicting an exemplary char preparation system.

An exemplary char preparation system is depicted in FIG. 2 and includes a cooler 91 that receives the char from the cyclone, and in some embodiments, overflow from the carbonizer (not shown). The char then flows through a pulverizer 92, a separator 93 that pulls out ash, and then an airlock 94, after which the pulverized char flows to the carbonizer. The char from a pressurized gasifier is less reactive than the char from, e.g., a pulverized coal furnace. On the other hand, char is much more fragile than coal, so the size of particles produced by the pulverizer are much smaller. The smaller the particles, the more quickly they burn and the smaller the volume of fluidized bed needed to burn them to completion. Without pulverizing, the char particles would not burn to completion, as indicated by the high unburned carbon losses in an externally-circulating gasifier when operated with high-rank coals.

The separator of FIG. 2 is employed to reduce the carbon concentration of fly ash produced in pulverized coal plants, to render it, e.g., more suitable as a raw material in cement manufacture. The ash concentration of char is several times higher than the ash concentration in coal, because all of the ash is contained in the char, yet only a fraction of the carbon remains after gasification. With coals of nominal ash content, e.g., under 10%, the combustion efficiency is expected to be high enough without the ash separator to make it unnecessary, whereas high ash concentrations make the char less combustible and combustion inefficient. Accordingly, with high-ash coals, and in particular, with high-ash coals where the ash is intrinsic, ash separation is employed. Conventionally, high ash coals are only marginally usable, however, the char preparation systems described herein now make it possible to use high ash coals, the system removes or reduces the ash content.

Figure 3:
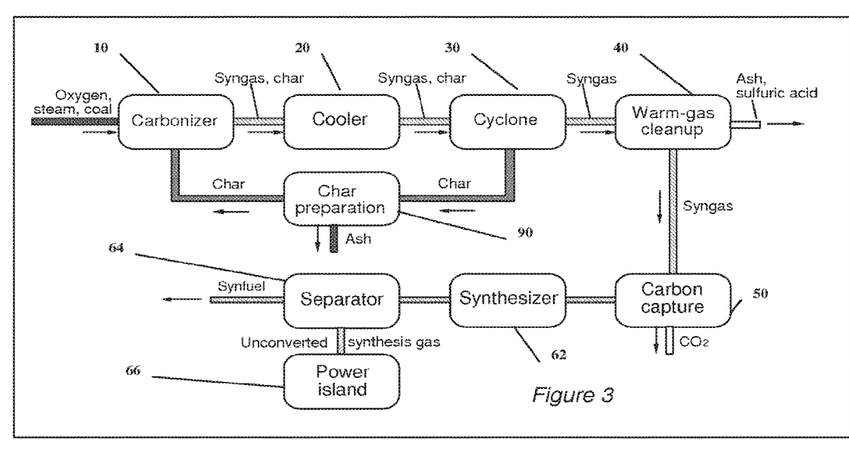
FIG. 3 is a flow diagram depicting an exemplary configuration of an IGCC employed to produce chemicals.

FIG. 3 is a flow diagram depicting an alternative exemplary configuration of an IGCC employed to produce chemicals such as ammonia, and hydrogen-CO mixtures for producing chemicals such as methanol and Fischer-Tropsch liquids. The production of fuel lends itself to polygeneration, whereby power is produced when the demand for it is high, and fuel is produced during off-peak times. The system is essentially the same as that depicted in FIG. 1, except for the synthesizer downstream that converts the syngas into a chemical, and a converter that removes whatever methane remains in the fuel. In this embodiment, hydrogen and nitrogen emerging from carbon capture 50 flows through the synthesizer 62 and then on to separator 64. Unconverted synthesis gas emerging from separator 64 is sent to power island 66 when power is needed.

Figure 4:
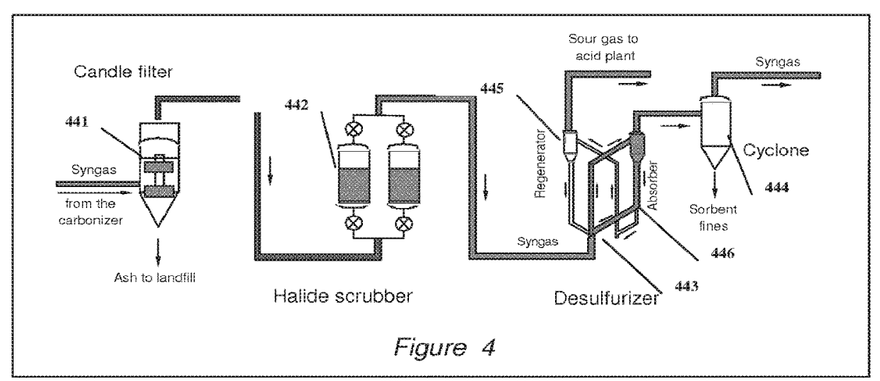
FIG. 4 is a diagram depicting an exemplary syngas cleanup system.

FIG. 4 is a diagram depicting an exemplary syngas cleanup system 40. Syngas flows through a candle filter 441, a halide scrubber 442, a desulfurizer 443, and finally a cyclone 444. The desulfurizer 443 includes a regenerator 445, whose exhaust stream is fed to an acid plant to produce sulfuric acid, and an absorber 446. The cyclone removes any sorbent fines form the syngas. Exemplary and suitable syngas cleanup systems are further described in International (PCT) Patent Application PCT/US2008/069455, published as WO 2010/075536 on Jul. 1, 2010, e.g., at paragraphs 110 et seq. and FIG. 4, the contents of which is expressly incorporated herein by this reference.

Figure 5:
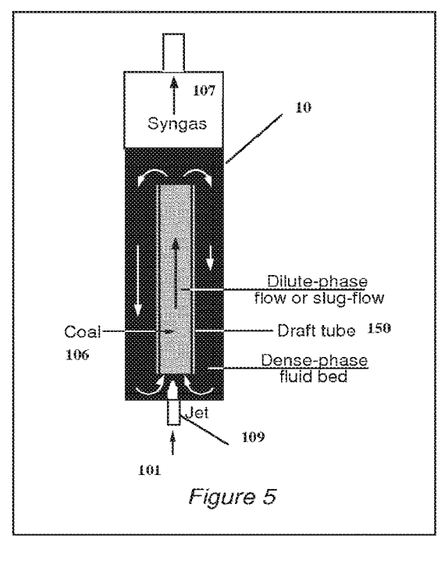
FIG. 5 is a diagram depicting the principal flows through an internally circulating fluidized bed carbonizer.

The principal flow through an exemplary internally circulating fluidized bed carbonizer or gasifier is depicted in FIG. 5. Char 101 is injected into the bottom of the carbonizer 10 into the inlet of a draft tube 150, while coal 106 flows into a section above the char injection jet 109. Syngas 107 emerges from the top of carbonizer 10. The circulating bed flows up through the draft tube 150 in dilute-phase flow or slug-flow, and returns external to the draft tube 150 to a dense-phase fluid bed. While there is some circulating flow external to the reactor in the flow system of FIG. 1, it is minor, representing less than 1% of the circulating flow of the externally circulating system.

Compared with bubbling-bed gasifiers, circulating fluidized bed reactors have more intense mixing, which reduces the temperature gradients. This, in turn, reduces the likelihood of clinkering, and enables the reactor to have separate zones for special purposes such as preserving the volatiles and providing an oxygen-free zone for pyrolysis, which reduces tar formation. The more intense mixing also makes scale up easier.

Benefits of the internally circulating gasifier, compared with the externally circulating system, include its simplicity and much shorter height. An exemplary gasifier constructed in accordance with the flow diagram of FIG. 5 can be only 25 ft tall versus the 150 ft of the externally-circulating fluidized bed gasifier discussed, e.g., in Wilsonville Power Systems Development Facility, <<http://psdf.southernco-.com>>(visited Jun. 16, 2006). The greater height of the latter is due in part to the need for a dipleg sufficiently tall to withstand the pressure drop through the system. Because the externally circulating solids of the system and methods described herein are cooled solids, a mechanical airlock 94 (FIG. 2) can be employed to recycle the solids, eliminating the dip leg. The gasifier section of an externally-circulating gasifier is also taller because of its higher throughput velocity.

Moreover, the externally-circulating gasifier coal feed is about 10-times smaller than that of the systems described herein. Accordingly, its coal must be crushed to sizes of, e.g., minus 0.03 inches versus, e.g., minus 0.25 inches for the systems described herein. This makes it difficult for the externally-circulating gasifier cyclones to capture the char fines, and as a result, only highly-reactive low-rank coals are efficiently gasified in the transport gasifier.

The coarser coal feed that can be employed in the systems and equipment described herein is advantageous as the coal is coarse enough to remain in the char bed until most of it is gasified. Eventually, about 15% of the coal becomes fine enough to be entrained by the syngas. However, these particles are still coarse enough to be readily captured by the cyclone. Thus, the carbon utilization depends on the efficiency of the char burner, which, if adequately sized, should be as high as that of other pulverized-coal systems, generally over 99%, with both low-rank and high-rank coals. As discussed in connection with FIG. 8 below, some exemplary carbonizer embodiments employ an agglomerator to remove ash from the system. In that case, the external ash separator is not required.

Figure 7:
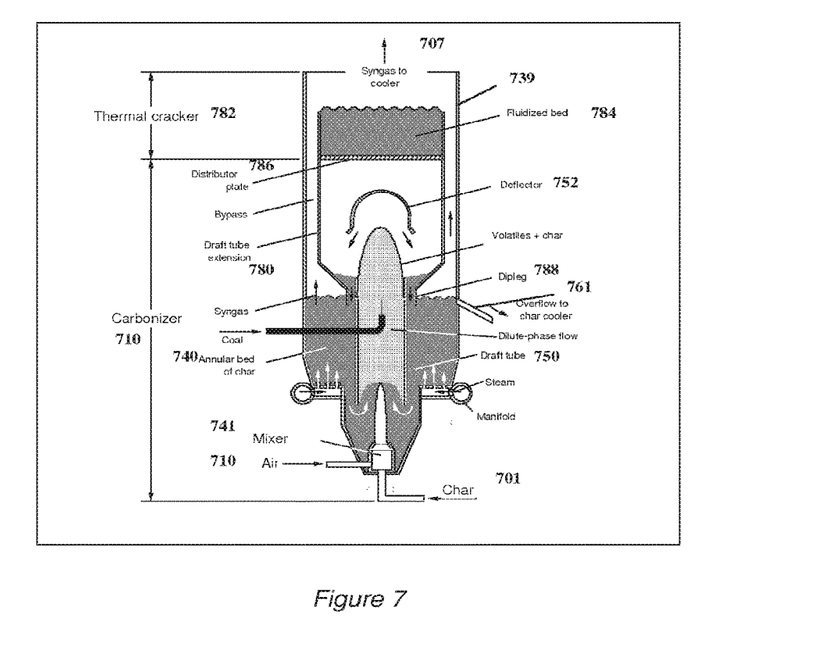
FIG. 7 is a diagram depicting a carbonizer with thermal cracking and dilute-phase flow.
Figure 8:
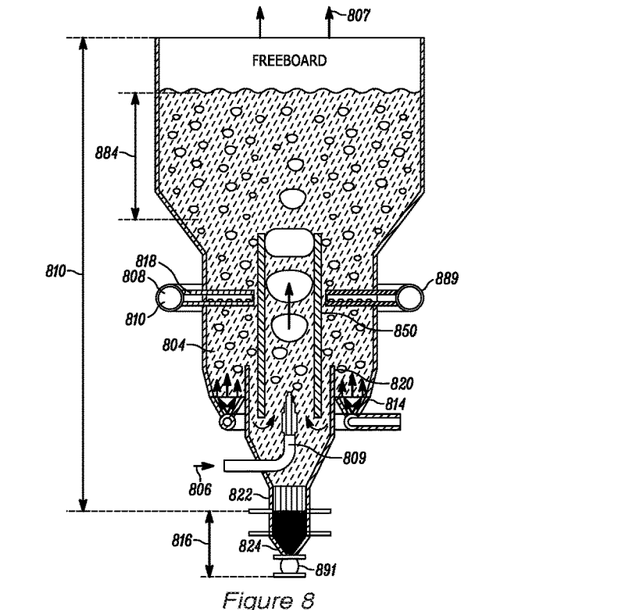
FIG. 8 is a diagram depicting an exemplary carbonizer with thermal cracking.

FIG. 6 depicts an exemplary carbonizer suitable for use with a warm-gas cleanup system in which the temperature of the syngas is never below the tar condensation temperature. Other exemplary embodiments described herein include carbonizers with thermal cracking (FIGS. 7 and 9) and char fines combustion in the annular bed (FIG. 8).

Referring to FIG. 6, an exemplary internally circulating fluidized bed carbonizer 610 and a fluidized bed syngas cooler 638 are disposed within in a pressure vessel 639. The fluidized bed syngas cooler 638 is fed a water stream 612 to cool the fluidized bed 638, which stream exits as steam 613. The fluidized bed of char 640 circulates up through the interior of a draft tube 650 and down its exterior. Char 601 and air 610 are mixed in a mixer 641 and injected into the bed of char at the bottom of the draft tube 650 via combustor 644. Fluidization is caused by steam 608 injected through, e.g., a distributor plate, which also gasifies the char, producing a mixture of carbon monoxide and hydrogen. The flow of solids around the bed begins with the entrainment of char by the gases in the draft tube 650, continues with their deflection by deflector 652 back onto the annulus, and ends with their downward flow through the annulus to complete the loop. Deflector 652 deflects coarse char or elutriates while syngas and char fines proceed to fluidized bed 638. The incoming flows (of coal 606, air 610, and steam 608) may be heated by external combustion (not shown). The draft tube 650 promotes the upward flow. A conduit 661 in communication with the fluidized bed of char 640, removes char from the carbonizer 610 at a rate that controls the temperature of the char in the carbonizer 610.

In some embodiments, a spouted fluidized bed carbonizer is employed. A fluidized bed gasifier with central jet to promote circulation is referred to as a "spouted bed" if the central jet penetrates the surface and a "jetting bed" if the central jet does not penetrate the surface. In some embodiments, a spouted reactor is used because it excels at keeping the entire volume in the reactor mixed—a quality known as "global mixing". For example, global mixing may occur in reactors as large as 15 ft in diameter, the size of reactor that can be utilized in connection with various embodiments, e.g., to feed a 400-MW power plant from a single vessel.

The draft tube generally promotes circulation, and also preserves the volatiles by isolating them from the air in the annulus. The flow through the draft tube is in dilute phase, so its pressure drop is low compared with the pressure at the bottom of the fluidized bed. This promotes char circulation, which in turn further helps keep the char temperatures uniform throughout the carbonizer. The mixing avoids the occurrence of hot spots which could clinker the ash, or cold regions in which the gasification would be too slow.

In some embodiments, the flow rates of the steam and air injected into the bottom of the annulus is metered to provide the desired amount of water-gas. The heat created by the exothermal reaction (of air reacting with char, forming carbon monoxide) may be modified or controlled such that it equals the heat required by the endothermic reaction (steam plus char forming hydrogen). The water-gas may pass through the char, and emerge from the top of the carbonizer (e.g., with the volatiles emerging from the draft tube), thereby forming the syngas. In some embodiments, the nitrogen from the air remains mixed with the syngas.

In some embodiments, the air and steam are injected into a plenum at the bottom of the char bed, and enter the bed through bubble caps in the plenum's top surface as described in International (PCT) Patent Application PCT/US2008/069455, published as WO 2010/075536 on Jul. 1, 2010, at e.g., FIGS. 7A and 7B and the accompanying description, the entirely of which is incorporated herein by this reference.

In some embodiments, excess char may be removed from the carbonizer via a hopper at its bottom, at a rate determined by a control valve. An exemplary control valve uses the pressure of steam flow to regulate char flow through the valve. The char flow rate may be controlled, e.g., by a level sensor at the side of the carbonizer, so the top of the bed is at a desired point. In some embodiments, the desired point is the same altitude as the top of the draft tube. Bottom-removal of the char may be preferred because, for example, it reduces or eliminates the possibility of a buildup of oversize particles in the char bed that might otherwise defluidize the bed. From the "L" valve, the char may then pass through the char cooler, which may be cooled by steam tubes, before being depressurized through an airlock.

In some embodiments, the pyrolysis of the coal will be largely completed by the time the particles leave the draft tube. To the extent that more reaction time is needed, pyrolysis may be further accomplished or completed in the upper region of the char bed.

The elutriates emerging from the draft tube are returned to the annular bed by an overhead deflector. "Elutriates" are particles too coarse to be entrained in the syngas, given sufficient freeboard to avoid their being splashed out of the reactor. The deflector can be employed to reduce or even eliminate the need for freeboard.

Conversely, char fines, whether emitted from the draft tube or annular bed, are particles small enough to be entrained by the syngas, no matter how high the freeboard. The particles leaving the deflector over the draft tube thereby diverts elutriates back to the bed, while allowing char fines to leave overhead.

Figure 9:
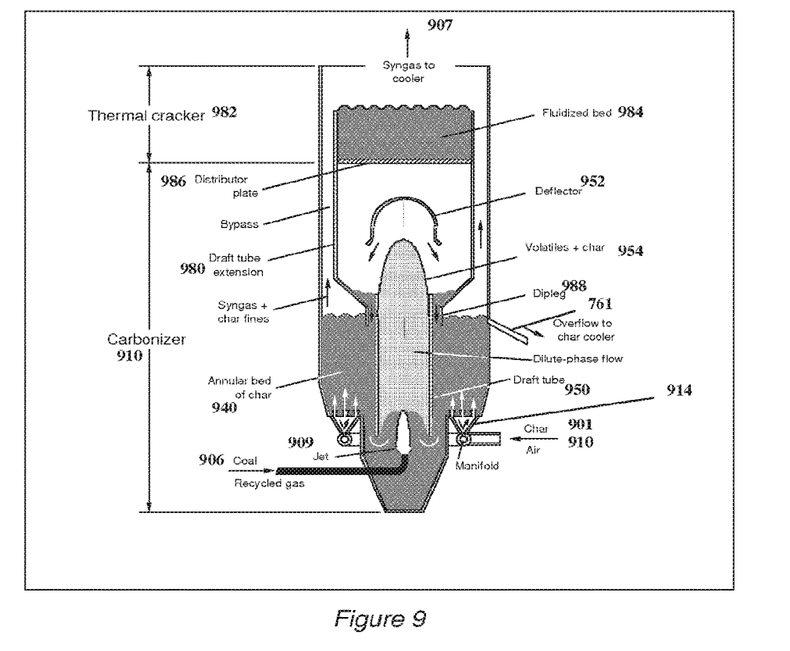
FIG. 9 is a diagram depicting an exemplary carbonizer with dilute phase flow and char fines combustion in the annular bed.

In some embodiments, the warm-gas cleanup system operates below the tar condensation temperature. If so, an upper bed can be added which thermally-cracks the tars in the volatiles, as depicted in FIGS. 7 and 9. The carbonizer operation is in some respects similar to that depicted in FIG. 6, whereby flow occurs upwards interior to the draft tube and down exterior to the draft tube, which is surrounded by a fluidized bed of hot char.

The upper beds depicted in FIGS. 7 and 9 provide sufficient residence time for the volatiles within a fluidized bed 784, 984 to thermally crack the tars, e.g., about 2-4 seconds. The shorter time is expected if the bed material is catalytic, such as dolomite or olivine. While thermally cracking is also increased by higher bed temperatures, it can occur at temperatures as low as, e.g., 1550° F.

In some embodiments, the upper fluidized beds 784, 984 depicted in FIGS. 7 and 9 can be employed for both thermal cracking and for desulfurizing the syngas, using a flow of half-calcined dolomite. For this, the bed must be operated in the vicinity of 1500° F., as higher temperatures deactivate the dolomite, and at lower temperatures, the dolomite does not calcine. As long as the carbonizer bed also operates at sufficiently high temperatures to avoid the formation of phenols (above 1550° F.), it should be possible to provide both functions. This dual functionality is useful if the desulfurizer of the warm-gas cleanup system can not achieve sufficiently-high desulfurization efficiencies by itself.

The funnel-like shape of the draft tube extender 780 in carbonizer 710 of FIG. 7 is employed, in part, to minimize the carbonizer diameter. Since the velocity in the lower fluidized bed must be relatively slow, the annular char bed 740 occupies most of the cross-section at the lower regions of the carbonizer, while the velocities in the draft tube 750—where dilute-phase flow occurs—is much higher. The high velocity in the draft tube 750 allows a significant reduction in diameter. In the upper section 782 of the carbonizer, where the central section contains a bubbling fluidized bed 784 with distributor plate 786, the syngas 707 emerging from the annular bed 784 can be allowed to flow at high velocities. Thus, the diameter of the pressure vessel 739 can be kept small in both regions.

In FIG. 7, deflector 752 deflects coarse char back into the fluidized bed while allowing syngas and char fines to proceed to the syngas cooler, and dipleg 788 provides for the downward flow of char. Char 701 and air 710 enter the mixer 741 and are injected into the bed of char at the bottom of the draft tube 750.

If pyrolysis is essentially complete in the draft tube, only the flow from the draft tube need be thermally cracked to remove the tars. However, in the event that pyrolysis is not completed in the time that the coal is within the draft tube, some volatiles can still be emitted from the annular bed. If the emission is sufficient to foul the downstream equipment, the upper bed can be extended across the entire reactor diameter, which will increase its diameter. Additionally or alternatively, the material in the upper bed can be made of coarse, dense materials, whose superficial velocity is relatively high, which limits the amount by which the carbonizer diameter must be increased.

Yet another alternative carbonizer design is shown in FIG. 8 where char fines are combusted in an annular bed. Carbonizer 810 includes a draft tube 850 surrounded by annular fluidized bed of char. The top of the draft tube 850 is submerged beneath an upper bed of char 884, which serves to separate the entrained char from the syngas 807, and also thermally-cracks the tars in the volatiles. Steam 808 and air 810 enters the upper bed 884 via sparge pipes 818 in manifold 889. The upward flow in the draft tube 850 is promoted by the use of a vertical jet 809 that entrains the circulating char. The flow through the draft tube 850 is slug flow, while the flow in the annular bed is bubbling-bed flow. By injecting the coal 806 into the draft tube 850, the danger of agglutination of highly caking coals is eliminated, and the volatiles are preserved. The coal 806 is injected into the draft tube 850 in an essentially oxygen-free atmosphere, and the heat to the system is provided by gases entering through a distributor plate 814 at the bottom of the annular fluidized bed 840. The ash in the bed is removed with an agglomerator 816. The agglomerator 816 removes the ash from the carbonizer 810, reducing the density of the char. In some embodiments, the need for an ash separator (see e.g., separator 93 in FIG. 2) can be reduced or eliminated by the use of the agglomerator 816.

The agglomerator 816 works by first burning char particles in a fluidized bed in a top section 822, which heats the particles enough to soften the ash and form larger particles (or, agglomerates). The agglomerates then flow through the lower section 824 of the agglomerator 816, where the airflow is sufficiently low to keep from fluidizing the particles. Accordingly the particles are cooled in counterflow by the air introduced at the bottom. By the time they reach the bottom of the agglomerator they are cool enough to be removed through the airlock underneath.

In contrast to the embodiment depicted in FIG. 6, where the source of heat to the carbonator is hot gases injected into the distributor under the annular bed, in FIG. 8 the heat comes from the combustion of char fines via distributor plate 814.

In some embodiments, sparge pipes 818 shown in FIG. 8 can also be employed to minimize the steam cooling of char fines at the bottom of the annular bed, and to maximize combustion efficiency. A separator sleeve 820 can also be employed, to minimize the escape of unburned chars fines into the draft tube 850. In some embodiments, the agglomerator is omitted.

One difference between the designs of FIGS. 7 and 8 relates to the char particle density. The agglomerator 816 of the carbonizer of FIG. 8 reduces the ash concentration in the bed to low levels by preferentially removing the ash, resulting in a very low bed density, typically less than 10 pounds per cubic foot. On the other hand, when the overflow pipe 761 of the carbonator of FIG. 7 is used to remove solids, the char particles removed from the bed contain both carbon and ash, so the average bed density is higher, between 20 and 40 pounds per cubic foot.

The effect of the char density is that, in a high-density bed embodiment, the hydrostatic pressure of the annular bed contributes significantly to the circulation of the char, while in a low-density bed embodiment, circulation is primarily due to the entering of the draft tube. The latter is a weaker mechanism than the former, so the circulation flows are much lower, typically, under 30 times the coal feed rate for the design of FIG. 8 versus over 100 times the coal feed rate for FIG. 7. The lower circulation ratios increases the temperature differentials around the circuit, that can lead to clinkering. However, the lower density is required with the slug flow of FIG. 8, as otherwise, the jet at the entrance of the draft tube is too weak to provide adequate circulation.

A high density design such as that shown in FIG. 7 also has a smaller diameter than a low density design such as that depicted in FIG. 8. A key characteristic of airblown gasifiers in general, at least, before that of the presently described embodiments, has been their large overall size, which has made them costly enough to reduce or eliminate the cost advantage they would otherwise have over oxygen-blown systems due to the elimination of the oxygen plant. In part, their larger size was due to the additional freeboard volume needed to gasify the char fines, which has been eliminated by mild gasification, and that the superficial velocity in a bubbling-bed is necessarily low, to keep from blowing the bed material out of the bed.

In the embodiment of FIG. 8, the superficial velocity in the char beds needed to avoid elutriation is particularly low, typically 1.2 to 1.5 ft/sec. Due to its higher density, the char bed in the carbonizer of FIG. 7 can be operated at somewhat higher velocities, e.g., 2.5 ft/sec, which reduces its diameter. The outcome is that, e.g., for a 400-MW IGCC, only one carbonizer is needed with the embodiments of FIGS. 7 and 9, but two may be needed with the embodiment of FIG. 8. Still, the cost of the carbonizer is typically less than 5% of the cost of the plant, as long as the auxiliary systems (such as feeders) do not significantly add to the cost. Thus, the embodiment of FIG. 8 can still be useful, despite its low superficial velocity.

Yet another alternative carbonizer, depicted in FIG. 9, combines the features of the embodiments FIGS. 7 and 8 in that the char burning arrangement of FIG. 8 is substituted for the char burning arrangement of FIG. 7. The advantage of this embodiment is that it would minimize the height of the draft tube and with it, the reactor height. In FIG. 9, the deflector 952 receives volatiles and char 954 from the draft tube 950 and deflects coarse char back into the fluidized bed while allowing syngas and char fines to proceed to the thermal cracker 982 via distributor plate 986, and dipleg 988 provides for the downward flow of char. Char 901 and air 910 enter the fluidized bed via distributor plate 914. Coal 906 and recycled gas are injected by a combustion jet into the bed of char at the bottom of the draft tube 950. This embodiment also features the draft tube extension 980. Syngas 907 emerges from the thermal cracker 982 to flow to the cooler (not shown). This embodiment also features overflow pipe 981 as described above.

Figure 10:
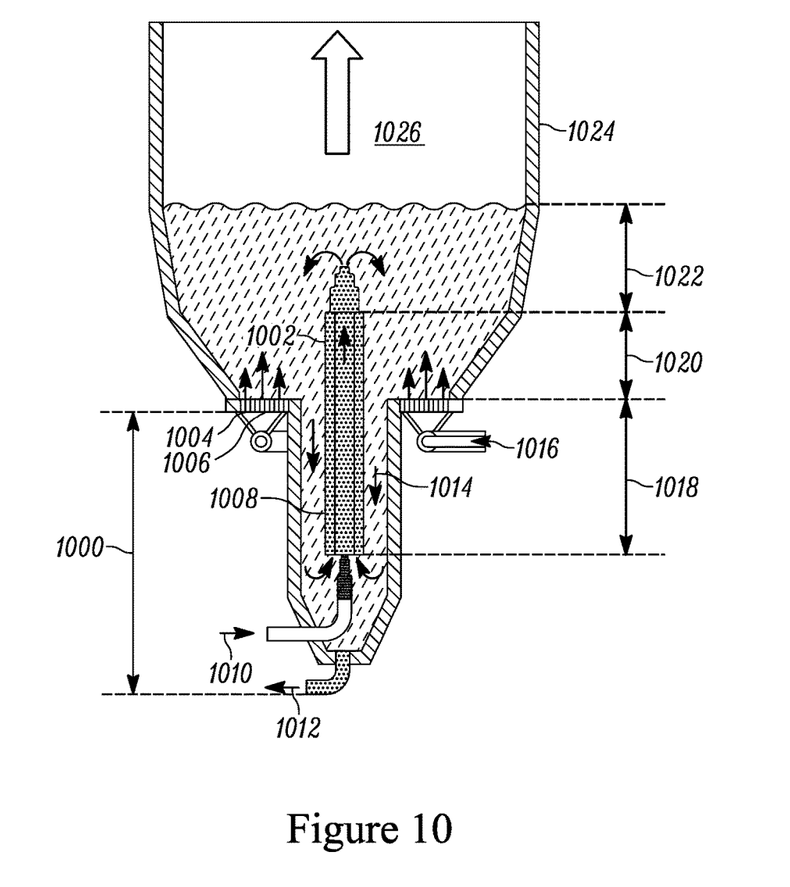
FIG. 10 is a diagram depicting yet another exemplary carbonizer.

Another embodiment of the internally-circulating carbonizer is depicted in FIG. 10. This embodiment provides high char circulation rates regardless of the reactivity of the fuel or the firing rate. Coal 1010 is pneumatically conveyed to the carbonizer and enters the draft tube 1008, where it is mixed with hot char 1014 entering from the annular bed 1020. The char fines 1016 are pneumatically conveyed to the carbonizer, along with their combustion air and the air and steam for gasifying the char in the annular bubbling bed in region 1020. The char fines enter the carbonizer through plenum 1006 and distributor plate 1004. The char bed 1022 provides the thermal cracking of volatiles emerging from draft tube 1009, and also prevents the spraying of char into the freeboard 1026 by covering the draft tube exit port.

Extension 1000 extends pressure vessel 1024 below distributor 1004 and reaching to the bottom of the drain 1012. The extension acts as a dipleg 1018 that increases the flow of char stream 1014 by increasing the hydrostatic head of char entering at the bottom of draft tube 1008. The extension 1018 provides sufficient hydrostatic head, which enhances circulation through the draft tube even if the coal is very reactive, or at low firing rates, both of which would reduce the height of the gasifier bed 1022. High circulation flowrate can be thus achieved to provide sufficient heat to the incoming coal to bring it to the bed temperature and thoroughly pyrolyze it. High circulation rates also prevent the agglutination of caking coals in the draft tube.

The circulation flowrate can be reduced if the char density is too low, due to the formation of cenospheres in highly-caking coals. The flow rate can be increased by the addition of inert granular material, such as dolomite, that increases the average density of the circulating solids.

Figure 11:
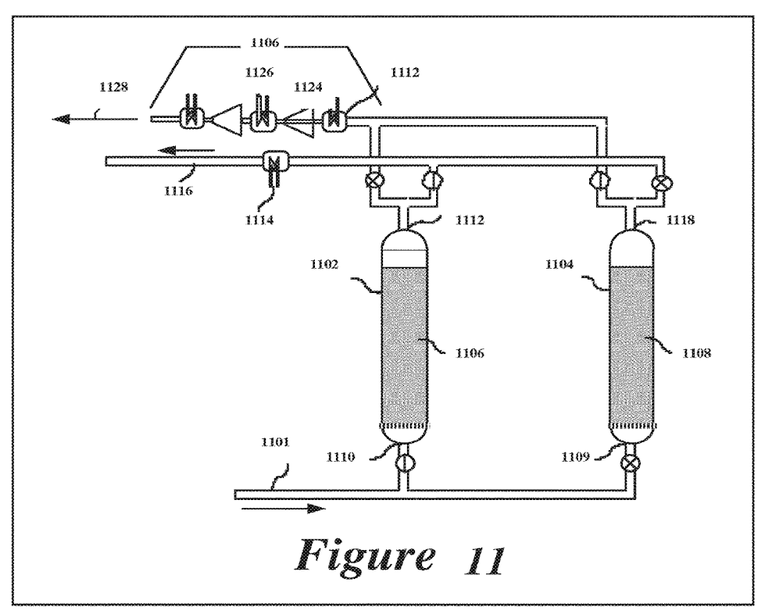
FIG. 11 illustrates an exemplary ACL system which implements sorbent-enhanced reaction (SER) using fixed-bed reactors.

In some embodiments, the systems and methods described herein further employ an ACL system for removal or reduction of carbon dioxide. FIG. 11 illustrates an exemplary ACL system which implements sorbent-enhanced reaction (SER) using fixed-bed reactors. A fixed-bed reactor is one in which the materials in its bed remain stationary. The exemplary ACL system of FIG. 11 includes reactors 1102 and 1104, each of which is configurable to operate as either a carbonator and as a calciner. When the valves in FIG. 11 are in the positions shown, reactor 1102 is the carbonator and reactor 1104 is the calciner. When each of the valve positions is reversed, reactor 1102 is a calciner and reactor 1104 is a carbonator. Each reactor contains a bed of sorbent in addition to, in the preferred embodiment, catalyst for steam reforming methane. In an exemplary embodiment, the catalyst is porous nickel.

In the exemplary embodiment of FIG. 11, syngas 1101 containing steam enters reactor 1102 through inlet 1110. The syngas is decarbonized in bed 108, and emerges from the reactor through outlet 1112. From there it is piped to cooler 1114 and conduit 1116 which is connected to a gas turbine in the case of an IGCC, or a synthesizer, in the case of a chemical plant.

Simultaneously, a vacuum in reactor 1104 created by compressor 1124 enables the sorbent in reactor 1104 to be calcined, which emits a stream of carbon dioxide through outlet 1118 that is cooled by cooler 1122 to enable compressor 1124 to operate efficiently. Further stages of compression in compressor assembly 1120, of which only two stages are shown, each include a compressor 1124 followed by an intercooler 1126. Compressor assembly 1120 compresses the carbon dioxide to the pipeline pressure. The final stage of assembly 120 includes cooler 1128, which cools the carbon dioxide before it enters pipeline 1128 on its way to the sequestration site.

Additional embodiments of exemplary ACL systems are discussed and shown in International (PCT) Patent Application No. PCT/US2010/######, entitled "Systems, Devices And Methods For Calcium Looping," by Alex Wormser, filed on Sep. 20, 2010, the entire contents of which is expressly incorporated herein by this reference.

It is noted that embodiments of the inventions described herein may include similar features, elements, arrangements, configurations, steps and the like. Therefore, for clarity purposes, some of the figures appended hereto, and referenced herein, include common reference numerals. However, common reference numerals are in no way meant to indicate that the commonly referenced features are identical or substantially similar, but instead simply indicates that the features are generally similar (such as features that perform a similar function).

What is claimed is:

1. An Integrated Gasification Combined-Cycle (IGCC) gasifier comprising:
   a pressure vessel comprising at least one inlet conduit that receives a supply air, a steam supply, a solid fuel, and pulverized char, and at least one outlet conduit that passes the pulverized char and syngas, the pressure vessel containing an internally-circulating fluidized bed carbonizer comprising a draft tube that receives a stream of the solid fuel surrounded by a two-zone fluidized bed system comprising an upper bed that thermally cracks tars in volatiles, and an annular fluidized bed surrounding the draft tube that carbonizes the solid fuel with fluidizing air and steam, the internally-circulating fluidized bed carbonizer producing a syngas and a char from the solid fuel;
   a syngas cooler coupled to an outlet duct of the internally-circulating fluidized bed carbonizer;
   a separator coupled to the syngas cooler that separates entrained char from the syngas;

a syngas cleanup system having an input coupled to the at least one outlet conduit of the pressure vessel that removes contaminants from the syngas produced by the internally-circulating fluidized bed carbonizer;

a char preparation system coupled to the separator that prepares the entrained char to be injected into the internally-circulating fluidized bed carbonizer, the char preparation system comprising:
- a cooler that removes heat from the char forming a cooled char,
- a pulverizer coupled to the cooler that pulverizes the cooled char, and
- an airlock coupled to the pulverizer; and an injector that receives the pulverized char from the char preparation system along with a stream of air for combustion of the pulverized char and introduces the pulverized char into the draft tube disposed in the internally-circulating fluidized bed carbonizer, whereby the pulverized char burns in the draft tube, thereby improving utilization of the solid fuel.

2. The system of claim 1, wherein the solid fuel is coal.

3. The system of claim 1, further comprising an ash separator coupled to the pulverizer.

4. The system of claim 3, wherein the carbonizer comprises:
- a distributor plate disposed within the carbonizer under an annular bubbling bed of char; and
- a dipleg disposed beneath the carbonizer.

5. The system of claim 3, wherein a stream of high-density particles is added to the annular bubbling bed of char, the stream of high-density particles increasing a circulation rate of the char from the draft tube to the fluidized bed.

6. The system of claim 1, wherein the pulverized char is injected, along with the stream of air for combustion of the char, into a plenum beneath a distributor plate located beneath an annular fluidized bed of char external to the draft tube disposed in the carbonizer, and coal is injected into an inlet of the draft tube.

7. The system of claim 6, wherein the plenum comprises an inlet beneath the distributor plate to introduce an oxidant and steam for gasifying the annular bed.

8. The system of claim 6, further comprising sparge pipes located above the distributor plates, wherein some or all of the oxidant for gasifying the annular bed is fed into the annular bed to provide efficient combustion of the char.

9. The system of claim 6, further comprising a separator sleeve mounted on an inner radius of the distributor plate such that the flow of the char into the inlet of the draft tube is limited.

10. The system of claim 1, further comprising:
a first pressure vessel comprising an inlet coupled to an outlet of the syngas cleanup system so that the first pressure vessel receives enough steam and syngas so that the steam reacts with the carbon monoxide in the syngas causing a water gas shift reaction that converts the carbon monoxide into hydrogen and carbon dioxide; an outlet for exhausting gases generated in the pressure vessel; and at least one bed of a sorbent comprising a calcium carbonate chemically-active compound, wherein the carbon dioxide formed is captured by the sorbent; and a second pressure vessel having an inlet coupled to the outlet of the first pressure vessel, and having a compressor used to pressurize the carbon dioxide captured in the first pressure vessel to a pipeline pressure, the second pressure vessel separating the carbon dioxide from the sorbent.

11. A method for increasing efficiency of an Integrated Gasification Combined-Cycle (IGCC) subsystem of a powerplant, the method including:

carbonizing a solid fuel by injecting the solid fuel into a pressurized carbonizer comprising a draft tube surrounded by a two-zone fluidized bed system comprising an upper bed that thermally cracks tars in volatiles, and an annular fluidized bed surrounding the draft tube that carbonizes a solid fuel with fluidizing air and steam, thereby producing a syngas stream and a char fines content;

separating the char fines content from the syngas stream;

cooling the char lines content;

pulverizing the char fines content;

reducing an ash fines concentration in the char fines content; and injecting the char fines content into the draft tube of the pressurized carbonizer as a fuel used to more efficiently generate the syngas stream and the char fines content and to more completely utilize the solid fuel, wherein the efficiency of the IGCC subsystem is increased by the return of the char fines to the pressurized carbonizer and its use as a fuel therein.

12. The method of claim 11, further comprising performing a method of removing contaminants from the syngas, the method comprising:

filtering the syngas to provide a filtered syngas;

adsorbing a halide component from the filtered syngas in a fixed bed reactor; and removing a sulfur component from the syngas with a regenerable desulfurizer comprising two circulating fluidized bed reactors that absorb the sulfur-bearing gases in the syngas in one reactor, and that regenerate the sorbent in the other reactor.

* * * * *